(12) United States Patent
Shaffer et al.

(10) Patent No.: US 8,994,830 B2
(45) Date of Patent: Mar. 31, 2015

(54) ACCESS TO VIDEO STREAMS ON MOBILE COMMUNICATION DEVICES

(75) Inventors: Shmuel Shaffer, Palo Alto, CA (US); Zeeshan Rahman Khan, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 1382 days.

(21) Appl. No.: 12/188,982

(22) Filed: Aug. 8, 2008

(65) Prior Publication Data

US 2010/0033580 A1 Feb. 11, 2010

(51) Int. Cl.
*H04N 17/02* (2006.01)
*H04N 21/61* (2011.01)
*H04N 21/2381* (2011.01)
*H04N 21/414* (2011.01)
*H04N 21/45* (2011.01)
*H04N 21/647* (2011.01)

(52) U.S. Cl.
CPC ....... *H04N 21/6131* (2013.01); *H04N 21/2381* (2013.01); *H04N 21/41407* (2013.01); *H04N 21/4524* (2013.01); *H04N 21/64707* (2013.01)
USPC .......................................................... 348/192

(58) Field of Classification Search
CPC .................. G08B 13/19608; G08B 13/19645; G08B 13/19656; H04M 11/04; H04M 2242/14; H04M 3/56; H04N 7/157; H04N 7/181
USPC ........................... 348/192; 455/416, 518, 521
See application file for complete search history.

(56) References Cited

U.S. PATENT DOCUMENTS

| 7,499,719 | B2 * | 3/2009 | Rengaraju et al. ............. 455/518 |
| 7,783,316 | B1 * | 8/2010 | Mitchell ........................ 455/521 |
| 7,864,716 | B1 * | 1/2011 | Manroa et al. ................. 370/260 |
| 2002/0137462 | A1 * | 9/2002 | Rankin ............................ 455/41 |
| 2005/0232352 | A1 * | 10/2005 | Siemens et al. ........... 375/240.12 |
| 2006/0293073 | A1 * | 12/2006 | Rengaraju et al. ............. 455/518 |
| 2007/0015518 | A1 * | 1/2007 | Winter et al. ............... 455/456.1 |
| 2007/0270172 | A1 * | 11/2007 | Kalley et al. ................... 455/518 |
| 2008/0036851 | A1 * | 2/2008 | Patel ................................ 348/21 |
| 2008/0108339 | A1 * | 5/2008 | Shaffer et al. ................. 455/416 |
| 2009/0082038 | A1 * | 3/2009 | McKiou et al. ............. 455/456.6 |

* cited by examiner

*Primary Examiner* — Aung S Moe
*Assistant Examiner* — Amy Hsu

(57) ABSTRACT

A method and apparatus to provide access to video streams associated with communication channels in a communication network are described. The method may comprise monitoring selection of a communication channel by a user of a mobile communication device, identifying at least one video feed associated with the selected channel, and providing access to the mobile communication device to the selected at least one video feed. Providing access may comprise associating the selected video stream with the mobile communication device.

30 Claims, 12 Drawing Sheets

US 8,994,830 B2

ACCESS TO VIDEO STREAMS ON MOBILE COMMUNICATION DEVICES

FIELD

The present disclosure relates generally to communication systems. In an example embodiment, the disclosure relates to providing access to video streams associated with communication channels in a communication network.

BACKGROUND

In general, a communication system is a collection of communications networks, transmission systems, relay stations, tributary stations, and data terminal equipment usually capable of interconnection and interoperation to form an integrated whole. Communication devices may communicate audio signals on different communication channels. Video feeds may also be communicated in the communication system.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to one skilled in the art that embodiments of the inventive subject matter may be practiced without these specific details. In general, well-known instruction instances, protocols, structures, and techniques have not been shown in detail.

Overview

A method and apparatus to provide access to video streams associated with communication channels in a communication network are described. The method may comprise monitoring selection of a communication channel by a user of a mobile communication device, identifying at least one video feed associated with the selected channel, and providing access to the mobile communication device to the selected at least one video feed. Providing access may comprise associating the selected video stream with the mobile communication device. In an example embodiment, a plurality of available video feeds is presented on a display of the mobile communication device, the plurality of available video feeds being available for communication to the mobile communication device. Selection of at least one video feed from the plurality of available video feeds may be monitored and the selected feed may be associated with the mobile communication device.

Example Embodiments

Figure 1A:
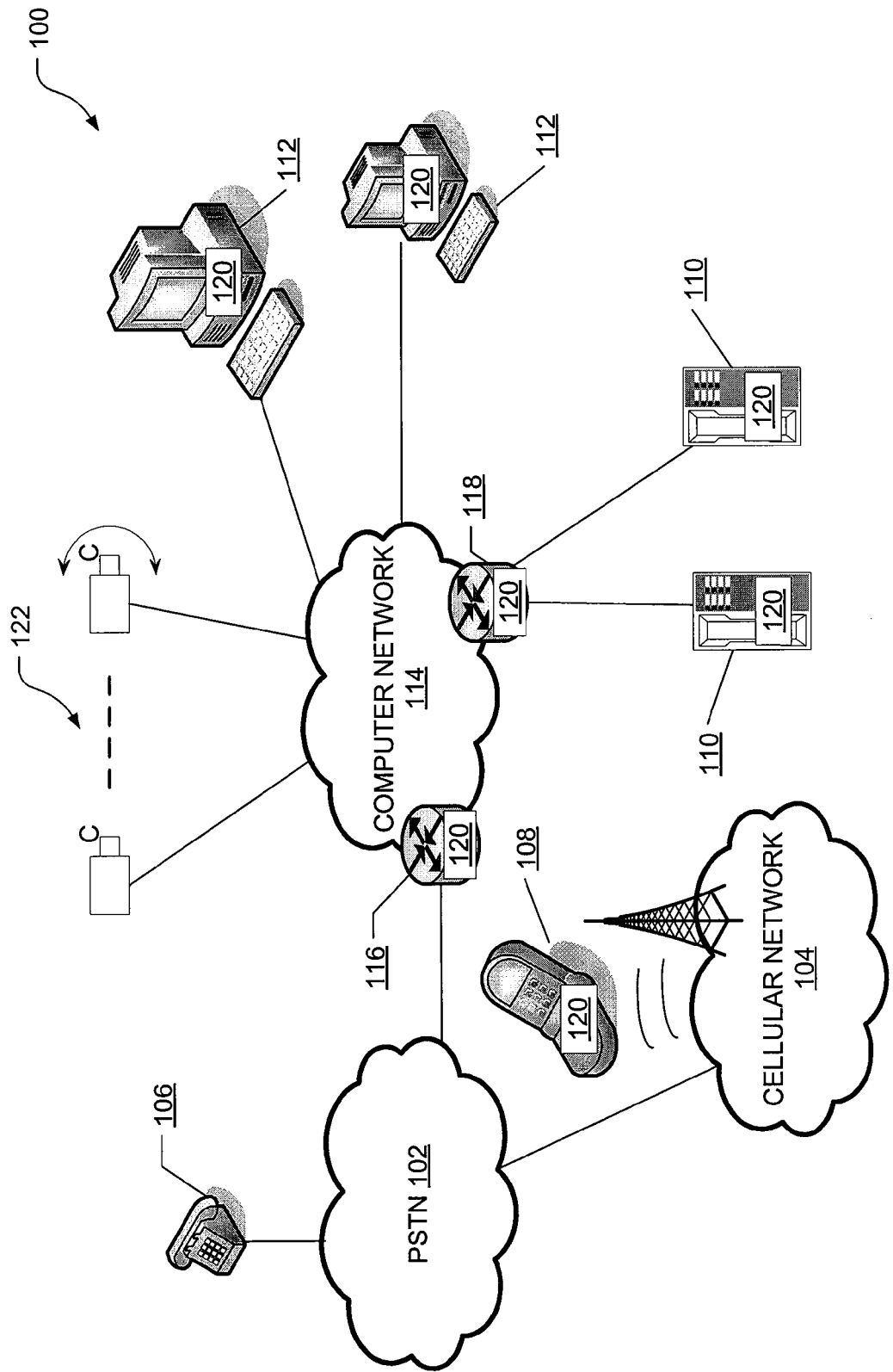
FIG. 1A depicts a simplified diagram of communication system, in accordance with an example embodiment, including full-duplex communication devices.

FIG. 1A depicts a simplified diagram of a communication system 100 in accordance with an example embodiment. The communication system 100 is shown by way of example to include a public switched telephone network (PSTN) 102, a cellular network 104, and various networked computing devices. Examples of communication devices include telephones 106, computers 112, Voice over Internet Protocol (VoIP) phones 110, mobile phones 108, gateways 116, routers 118, switches, transmission systems, relay systems, and other communication devices. A plurality of cameras 122 provide video feeds that, in an example embodiment, are associated with communication channels (e.g., communication channels providing Virtual Talk Groups (VTGs)).

In general, the computer network 114 is a collection of interconnected computing devices that communicate using wired or wireless mediums. Examples of computer networks, such as the computer network 114, include Local Area Networks (LANs) and/or Wide Area Networks (WANs), such as the Internet. It should be understood that a communication device, as referred to herein, includes any equipment used in communication and associated with, or attached to, a communication network.

The PSTN 102 may include a Plain Old Telephone System (POTS). The PSTN 102 includes a collection of interconnected systems operated by telephone companies. The PSTN 102 may, for example, include the telephones 106, switches, and other systems and elements. The PSTN 102 may communicate with the computer network 114 via the gateway 116. The gateway 116 may provide voice interoperability between computer and non-computer networks, such as the PSTN 102, by bridging telephone transmissions to Internet Protocol (IP) multicast streams.

The PSTN 102 is also shown to communicate with the cellular network 104. The cellular network 104 includes a type of radio network with a full duplex system. Examples of the cellular network 104 include code division multiple access (CDMA), time division multiple access (TDMA), and other cellular networks. The mobile phones 108 may communicate via the cellular network 104.

As illustrated by way of example in FIG. 1A, the communication devices may host a video feed association module 120. As explained in more detail below, the video feed association module 120 may be configured to associate one or more video feeds (e.g., media streams from one or more of the cameras 122) transmitted over the computer network 114 with one or more communication channels (e.g., audio channels in a radio network). In an example embodiment, the video feed association module 120 may act as filter removing or filtering video feeds accessible by, or provided to, a communication device. Accordingly, in an example embodiment, only those video feeds that are of particular interest to a user of the communication are presented to the user. The user may thus not be bombarded with a host of video feeds that are not relevant in a specific circumstance. In an example embodiment, one or more of the cameras 122 are independent video surveillance cameras (e.g., surveillance cameras installed along freeways, at traffic intersections or and public and non-public locations). In the example system 100, the communication devices are shown by way of example to include the video feed association module 120 and thus association of the feeds is shown, by way of example, to be performed at endpoints in a communication network. It will however be appreciated that the association can be performed, in addition or instead, at a central location. The association may be done between independent voice communication devices and independent video surveillance cameras (e.g., the cameras 122).

Figure 1B:
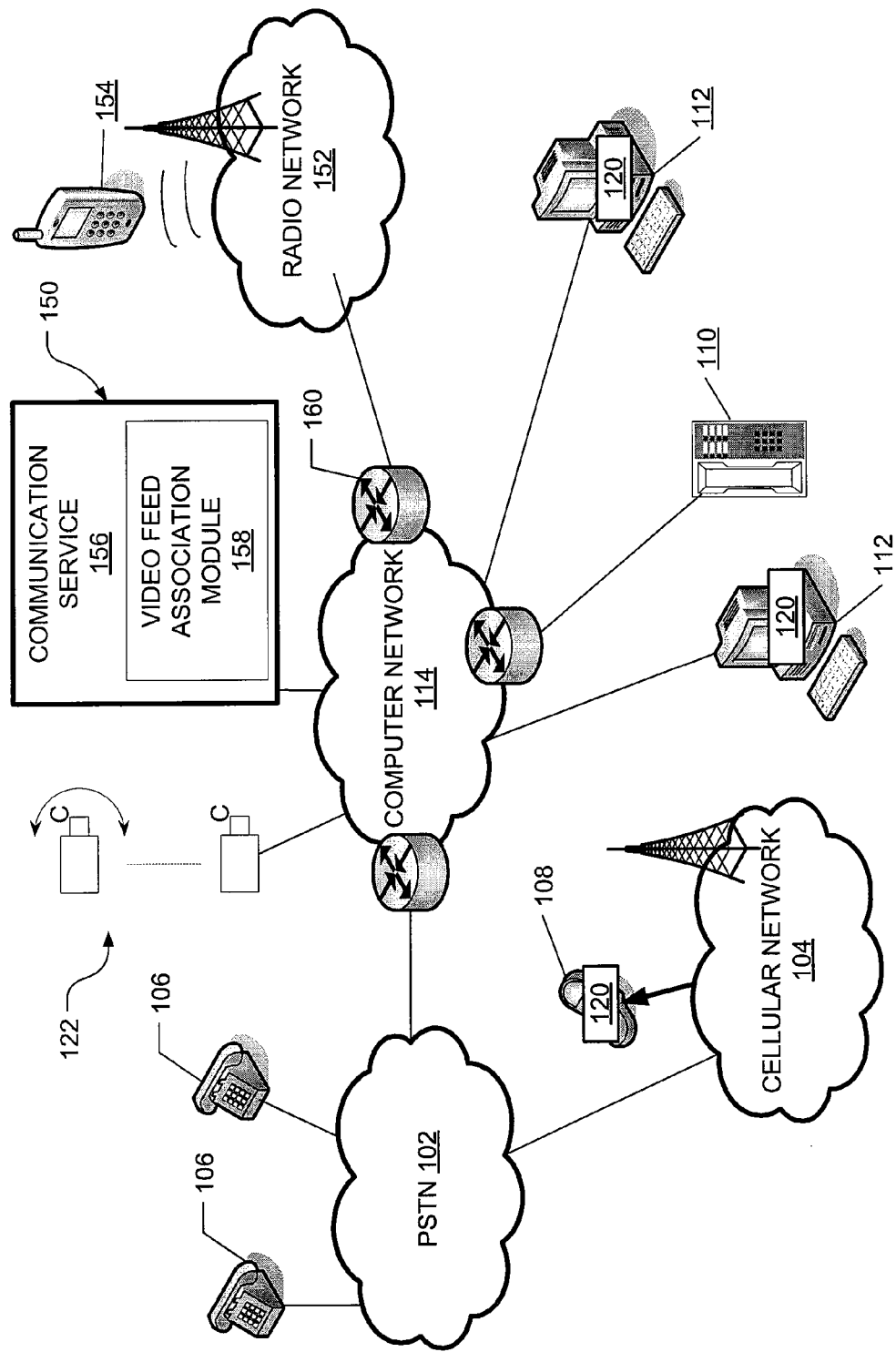
FIG. 1B depicts a simplified diagram of a further communication system, in accordance with an example embodiment, including both full- and half-duplex communication devices.

FIG. 1B depicts a communication system 150, in accordance with an example embodiment, in which one or more video feeds are associated with one or more communication channels at a central location. The communication system 150 is similar to the communication system 100 and, accordingly, like reference numerals are used to indicate the same or similar features.

The communication system 150 further includes a radio network 152 configured to communicate with one or more mobile communication devices (e.g., one or more push-to-talk (PTT) radios). The communication system 150 may thus include full-duplex communication devices (e.g., the telephones 106, the mobile phones 108, the VoIP phones 110 and the computer 112), as well as half-duplex communication devices (e.g., the PTT radios 154). The communication service 156 may be provided to facilitate communication in the communication system 150. The communication service 156 may include a variety of software applications and/or hardware that can monitor and process communications between the communication devices. The communication service 156 can be hosted on one or more server computers and, as explained in more detail below, may be configured to facilitate communication of media streams on a plurality of communication channels. An example of communication service 156 is the IP Interoperability and Collaboration System (IPICS) network available from Cisco Systems of California that facilitates communication interoperability amongst different communication paradigms. A communication paradigm (or a communication modality) includes a mode of communication amongst a collection of interrelated communication devices. The communication paradigm can be distinguished by data format, type of signal, physical link or infrastructure, or other communication characteristics (e.g., half duplex or full duplex communications). For example, the communication system 150 may facilitate communication between the PTT radios 154 (e.g., ultra high frequency (UHF) radios, very high frequency (VHF) radios, and other push-to-talk radios) via the radio network 152 and telephony endpoints (e.g., the telephones 106) of the PSTN 102. In another example embodiment, the communication system 150 can facilitate communication between the push-to-talk radio 154 of the radio network 152 and the VoIP phones 110 or a software client residing on the computers 112. The communication system 150 may control the media and signaling of radio and VoIP systems, resulting in a direct communication between the different communication devices (e.g., between the PTT radios 154 and the VoIP phones 110).

It should be appreciated that radio network 152 may be a collection of communication devices that communicate over radio waves, such as ultra high frequency (UHF) and very high frequency (VHF). The radio network 152 includes, for example, a land-mobile-radio (LMR) network. Examples of communication devices included in radio network 152 include the PTT radios 154 (e.g., UHF radios, VHF radios, and other radio network-based communication devices). It should be noted that PTT radios 154 or other communication devices included in radio network 152 may be push-to-talk radios that operate in half duplex mode, which is in contrast to the communication devices (e.g., the telephones 106) that operate in full duplex mode. The radio network 152 may communicate with the computer network 114 by way of a gateway 160, which provides voice and control interoperability between the radio network 152 and the computer network 114 by bridging media and control transmissions to Internet Protocol (IP) multicast and/or Unicast (e.g., Session Initiation Protocol (SIP)) streams.

The communication service 156 (e.g., an IPICS) is shown to include a video feed association module 158 to associate one or more video feeds with one or more communication channels and thus facilitate access to the video feed by a user of a mobile device having video capabilities.

In the example embodiment shown in FIG. 1B, further video feed association modules 120 may be optionally provided at the communication devices. Thus, association of the video streams with the communication channels (e.g., voice channels) may take place at a central node and/or distributed nodes.

Figure 2:
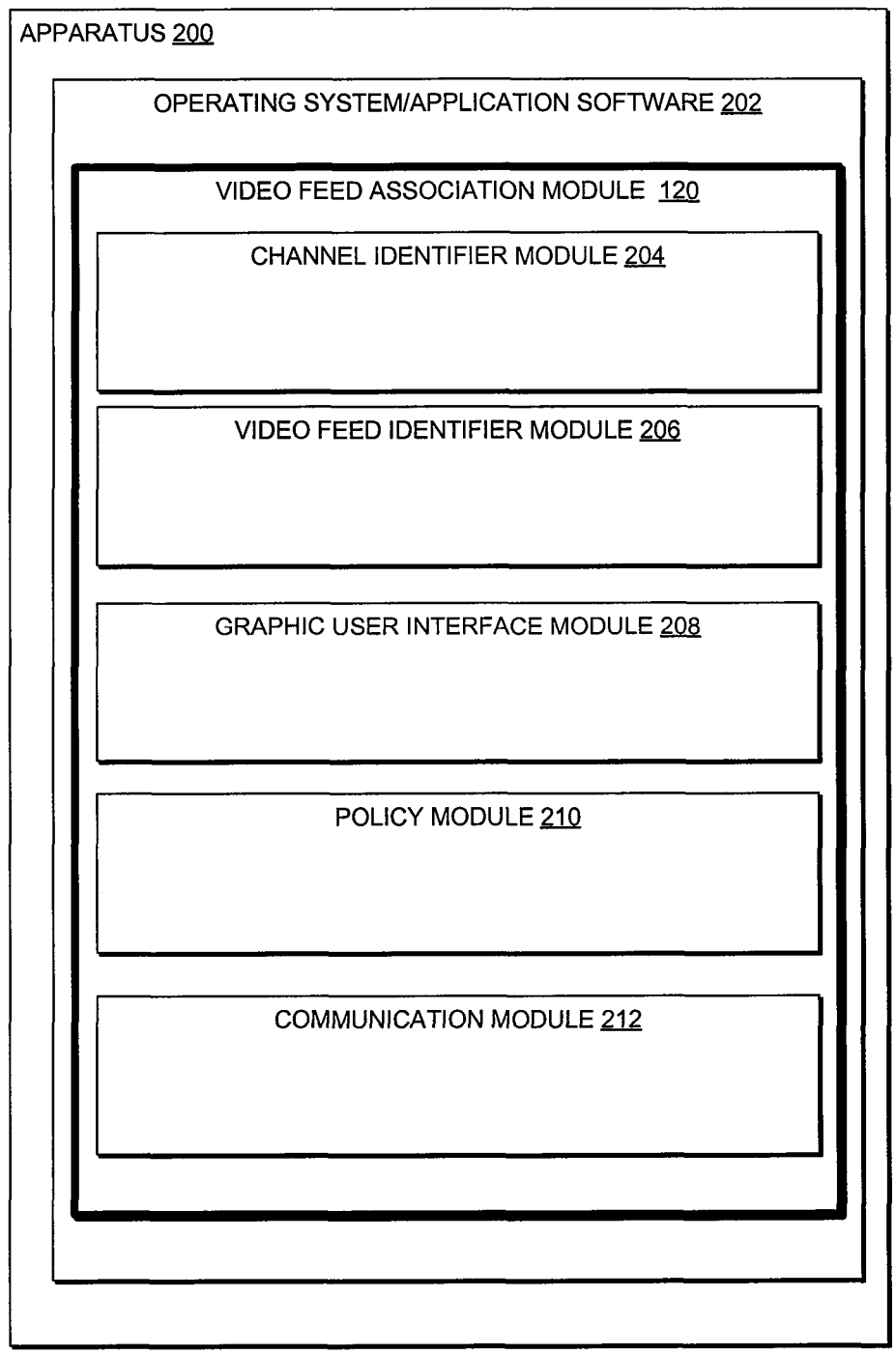
FIG. 2 depicts a simplified block diagram of an apparatus, in accordance with an example embodiment, to associate video feeds with a communication channel associated a plurality of mobile communication devices.

FIG. 2 depicts a simplified block diagram of an apparatus 200, in accordance with an example embodiment, to associate video feeds with a communication channel associated a plurality of mobile communication devices. The apparatus 200 may be deployed in the communication networks 100, 150 and, accordingly, is described by way of example with reference thereto.

The apparatus 200 includes memory for storing and operating system and application software 202 that, when executed, performs the methodologies described herein. The apparatus 200 includes a video feed association module 120 shown to include a channel identifier module 204, a video feed identifier module 206, a graphic user interface (GUI) module 208, a policy module 210, and a communication module 212. As described by way of example in more detail below, the apparatus 200 allows a user to select one of a plurality of communication channels wherein each communication channel may have a plurality of video feeds automatically associated with the communication channel. The communication channel may host a VTG. Operation of the apparatus 200 is described by way of example below.

Figure 3:
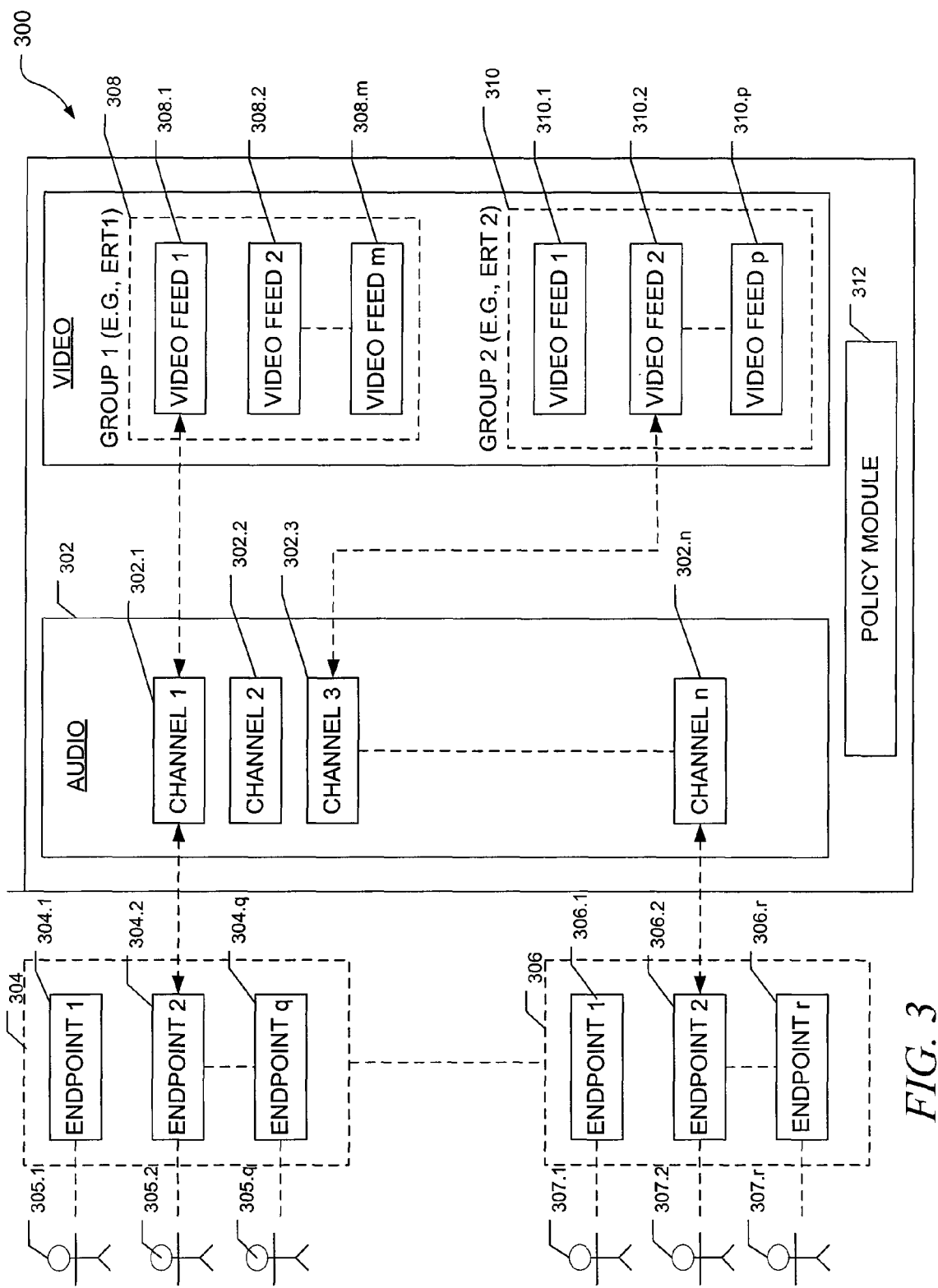
FIG. 3 depicts a schematic diagram of a system, in accordance with an example embodiment, wherein video feeds are associated with a communication channel.

FIG. 3 depicts a schematic diagram of a system 300, in accordance with an example embodiment, wherein video feeds are associated with a communication channel. The system 300 may include the apparatus 200 and may be deployed in the communication systems 100, 150. The system 300 is described by way of example with reference to the systems 100, 150.

The system 300 is shown to include a voice communication network 302 including a plurality of communication channels 302.1-302.*n*. Each communication channel 302.1-302.*n* may host a virtual talk group (VTG) hosted by the communication systems 100, 150.

Various communication endpoints (e.g., the telephones 106, the mobile phones 108, the VoIP phones 110, the PTT radios 154, and the computers 112) may participate in communications in a particular virtual talk group (VTG). The communication endpoints may be grouped, for example, in to emergency response teams. Accordingly, the system 300 is shown by way of example to include a first group 304 comprising communication endpoints 304.1-304.*q*. Users 305.1-305.*q* are respectively associated with endpoint 304.1-304.*q*. In the example embodiment, the users 305.1-305.*q* have their communication endpoints set to a channel 1. Likewise, in the example system 300 shown in FIG. 3, a second group 306 is shown to comprise communication endpoints 306.1-306.*r*. In a similar fashion to the first group 304, the endpoints 306.1-306.*r* are each associated with a user 307.1-307.*r*, respectively. The users 307.1-307.*r* are shown to have their mobile communication devices 306.1-306.*r* set to channel n.

In addition to the audio channels 302.1-302.*n*, the system 300 includes a plurality of video feeds 303. The video feeds 303 are shown by way of example to be grouped into a first group 308 and a second group 310. Each group 308, 310 may be associated with one or more communication channels. Accordingly as shown by way of example in FIG. 3, the first group 308 is shown to be associated with the first channel 302.1 and a second group 310 is associated with third channel 302.3. The first group 308 is shown to include video feeds 308.1-308.*m* and the second group 310 is shown to include video feeds 310.1-310.*p*. The first group 308 may be associated with an emergency response team (e.g. a fire department emergency response team, a police emergency response team, or the like). The second group 310 may, for example, be associated with a different emergency response team.

As described in more detail below, video feeds 308.1-308.*m* may be automatically associated with the first channel 302.1 so that, in use, when any user 305.1-305.*q* sets an associated mobile communication device 304.1-304.*q*, respectively, to the first channel 302.1 the video feeds 308.1-308.*m* are made accessible to the users 305.1-305.*q*. In the example embodiment, the video feeds 310.1-310.*p* are shown not to be presented to the users 305.1-305.*q* and thus, for example, video feeds that may not be relevant to a particular VTG may thus not be made accessible to the users 305.1-305.*q*. Thus, in an example embodiment, the users 305.1-305.*q* are not presented with video feeds that are not relevant to their particular group 304. The group 304 may correspond to the group 308. As a result, in an example embodiment the users 305.1-305.*q* may focus their attention to video feeds that are relevant to their operation.

In an example embodiment, a dispatcher may render access to a particular user(s) (e.g., the user 305.1) to a specific channel or a specific VTG. When the dispatcher renders access to a specific channel or VTG, the system 300 may automatically render access to the associated video feeds 308.1-308.*m* to the user (e.g., the 305.1).

The system 300 is also shown, by way of example, to include a policy module 312. The policy module 312 may automatically associate video feeds with a particular group of video feeds, automatically associate groups of feeds with channels, VTGs, or the like based on policy data. In an example embodiment, the policy module 312 may also determine which video feeds in a group of video feeds are viewable by any one or more of the users 305.1-305.*q*. For example, certain video feeds may not be rendered to one or more of the mobile communication devices 304.1-304.*q*.

In an example embodiment, the policy module 312 may analyze a current location of the users 305.1-305.*q*. As one or more users 305.1-305.*q* approach a location from which specific video feed is originating (e.g., a video feed from a camera 122 pointed at a junction towards which a fire-truck is heading, the policy module 312 may automatically associate the video feed from the relevant camera 122 with the communication channels of the fire truck and render access to this video feed to all other members of a fire-truck VTG. In an example embodiment, the policy module 312 may include one or more of the following policies: a policy that may be set by the user, a policy that may be set by the dispatcher or administrator, a policy that governs only a specific user, or a policy that may govern all users of the system 300.

Figure 4:
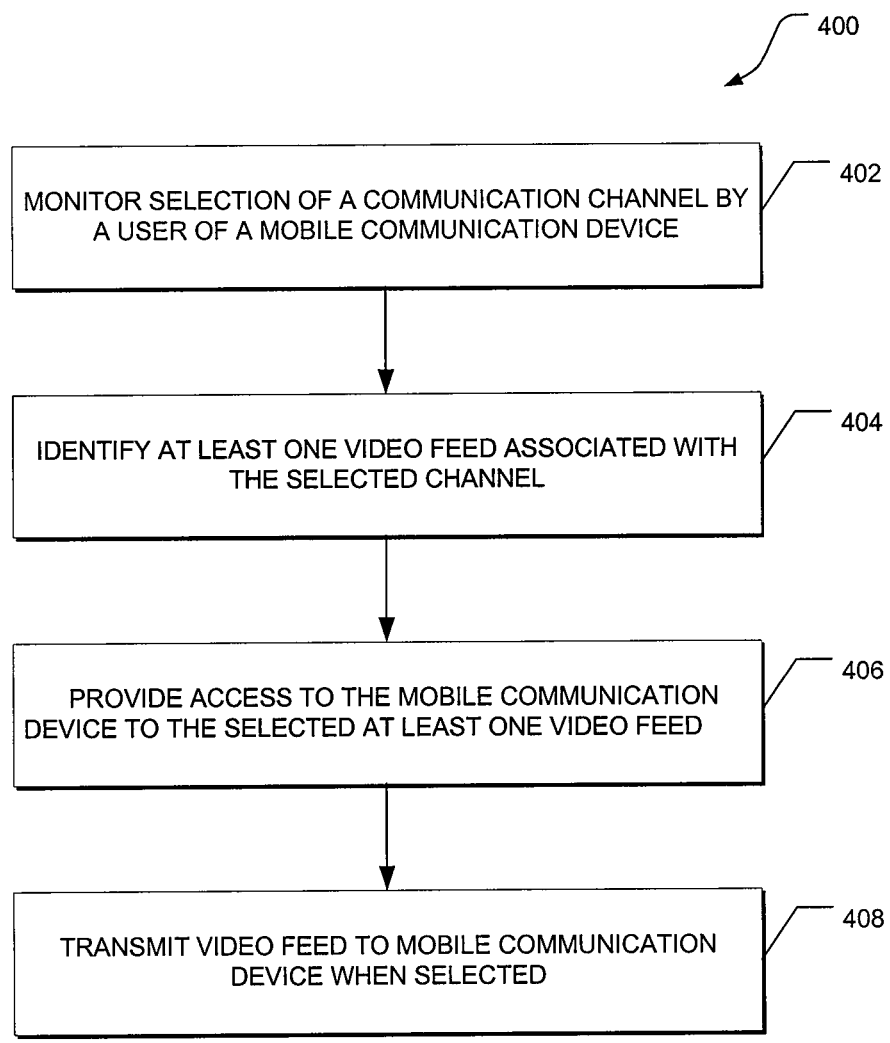
FIG. 4 depicts a flow diagram of a general overview of a method, in accordance with an example embodiment, for associating video feeds with a communication channel that is associated a plurality of mobile communication devices.

FIG. 4 depicts a flow diagram of a general overview of a method 400, in accordance with an example embodiment, for associating video feeds with a communication channel associated a plurality of mobile communication devices. The method 400 may be performed by the apparatus 200 (see FIG. 2) and, accordingly, is described by way of example with reference thereto. In the method 400, a user interface may optionally be presented to a user (e.g., the user 305.1-305.*q* or 307.1-307.*r*) to allow the user to select a communication channel 302.1-302.*n* to which his/her mobile communication device 304.1-304.*q* or 306.1-306.*r* is to be set or tuned to. The method 400, as shown at block 402, may then monitor selection of a communication channel by the user 305.1-305.*q*, 307.1-307.*r* of an associated mobile communication device 304.1-304.*n*, 306.1-306.*r*. Thereafter, as shown at block 404, the apparatus 200 may identify which particular channel has been selected (e.g., see the channel identifier module 204 in FIG. 2). At least one video feed associated with the selected channel (see block 404) may be identified (e.g., by the video feed identifier module 206). It will be appreciated that, one or more of the communication devices 304.1-304.*n*, 306.1-306.*r*. may not receive any feeds. Thus, in an example embodiment, a dispatcher may control what video feeds 308.1-308.*m*, if any, are made available to one or more of the users 305.1-305.*q*, 307.1-307.*r*.

It should be noted that the rendering of access to the video feeds 308.1-308.*m* is not limited to operations or selections performed on the mobile communication device 304.1-304.*q* or 306.1-306.*r*. In addition or instead, the user interface may be presented to a dispatcher who may then configure the nature of the access made available to the users (e.g., the user 305.1-305.*q* or 307.1-307.*r*). For example, the dispatcher may configure which channels or VTGs a user 305.1-305.*q* or 307.1-307.*r*) may access. In this example embodiment, since the video feeds may be associated with a given channel or VTG, as the dispatcher renders the access to specific channel or VTG to a given user, the user is automatically also presented with access to the associated video feeds which may be relevant to his/her operation.

Once the particular channel has been selected and the at least one video feed associated with the channel has been identified, the method 400 may then provide any mobile communication device 305.1-305.*q* or 307.1-307.*r* that is set to the particular channel with access to the at least one video feed. In an example embodiment, a plurality of different video feeds is associated with each channel in an automatic manner so that the feeds are made available to a user of a mobile communication device that is set to the associated channel. In an example embodiment, a GUI is optionally provided to the user to select one, or a subset, of the plurality of video feeds, whereafter, as shown at block 408, the video feed may be then communicated to the mobile communication device.

Figure 5:
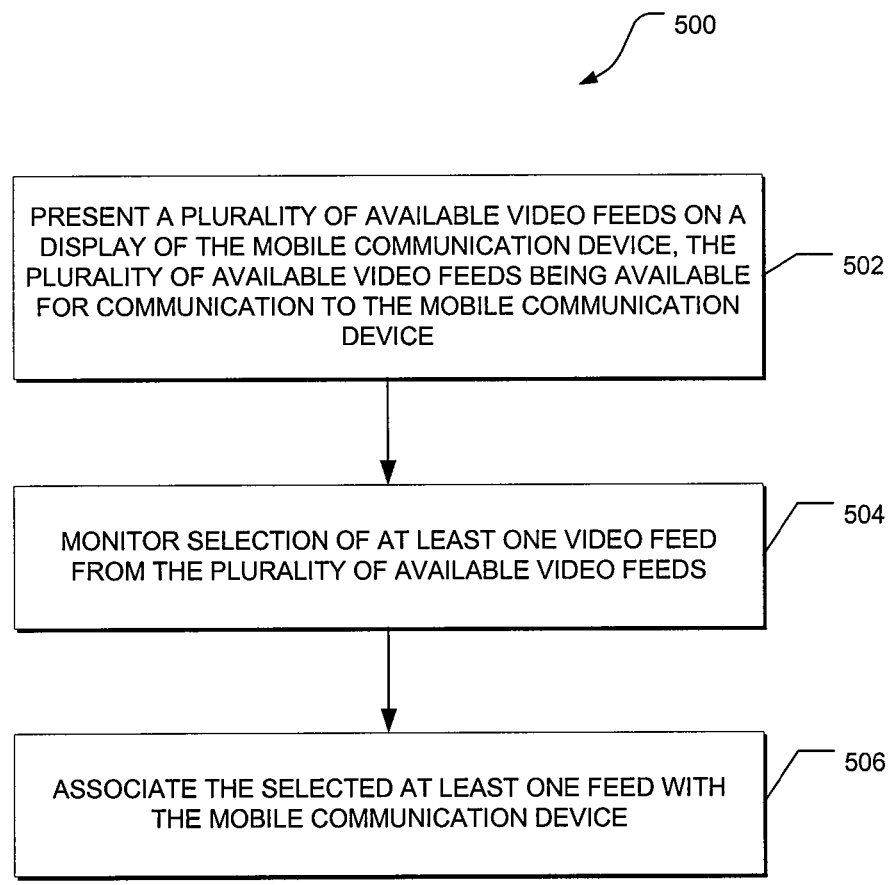
FIG. 5 depicts a flow diagram of a general overview of a method, in accordance with an example embodiment, for identifying channels with which to associate video feeds.

FIG. 5 depicts a flow diagram of a general overview of a method 500, in accordance with an example embodiment, for identifying channels with which to associate video feeds. As shown at block 502, access to a plurality of available video feeds, associated with a communication channel, may be provided on a display of the mobile communication device (e.g., the mobile communication devices 304.1-304.$q$, 306.1-306.$r$). In an example embodiment, as only a limited number of relevant video feeds may be provided to a user, selection of an appropriate video feed may be facilitated. For example, in the system 300 shown in FIG. 3, the video feeds 308.1-308.$m$ are associated with the first channel 302.1. When the mobile communication devices 304.1-304.$q$ are set to have access to the first channel 302.1, the operation in block 502 may enable access to video feeds 308.1-308.$m$ to the users 305.1-305.$q$.

As shown at block 504, the method 500 may then monitor selection of at least one video feed from the plurality of available feeds (e.g., the video feeds 308.1-308.$m$) and associate the selected at least one video feed with the one or more of the communication channels 302.1-302.$n$. or one or more specific VTG. When the system 300 renders to a specific mobile communication devices 304.1-304.$q$, 306.1-306.$r$ the ability to access a specific channel 302.1-302.$n$. or a specific VTG, the system 300 may automatically render to the same communication device 304.1-304.$q$, 306.1-306.$r$ the ability to access the associated video feed. The associated video feed may be streamed to the mobile communication device if the user selects the associated video feed from a sub-set of video feeds to which he/she was provided access to. In an example embodiment, the video feeds may be stored at a central location and, upon selection of the video feed by the user, they may then be streamed to the mobile communication device 304.1-304.$q$, 306.1-306.$r$. In addition, or instead, the video feeds may be live video feeds streamed in real time.

In an example embodiment, the video feeds may be video feeds sourced from a video surveillance camera. Thus, the methods and apparatus described herein may be used by public safety and first responders (PSFR) and by emergency response teams (ERT). In an example embodiment, the methods 400, 500 and apparatus 200 are deployed in an IPICS system as described by way of example with reference to FIG. 1B. Accordingly, in an example embodiment, the communication channels are communication channels in the PTT network. Only a limited number of video feeds may be associated with a VTG and video feeds that are not relevant to operations associated with a particular VTG may be filtered. Accordingly, in an example embodiment, the example methods described herein may provide automated control of access by PSFR and ERT team members to video surveillance streams. In an example embodiment, by controlling the video feeds to which ERT personnel have access, the system 300 may automatically facilitate access only to relevant video streams while reducing the information overload to the end user. By limiting the access to non-relevant video streams, information overload is at least reduced thus enhancing the efficiency of ERT personnel.

In an example embodiment which includes a communication system with trunk radio, base stations may be provided that a system administrator can use to facilitate communication with different teams which utilize specific communication channels. For example, users may select a specific region with which they may want to communicate and within the specific region, a specific radio base station may be requested to tune itself to a specific frequency associated with a predetermined communication channel. A user of the mobile communication device 304.1-304.$q$, 306.1-306.$r$ may select a specific region from a set of regions. By selecting the specific region the user may gain access to the radio base station associated with the said region. When a user selects a particular region, the user may be presented with communication channels (see channels 302.1-302.$n$) where each channel 302.1-302.$n$ is associated with a specific region and as such with a specific radio base station. Thus, in one example embodiment the first group 308 in the system 300 shown in FIG. 3 may be associated with one geographical region and the second group 310 may be associated with a second geographical region. In a similar fashion to the GUI to select channels on a mobile communication device, a GUI may be provided to select regions.

In an example embodiment, when a user selects a specific VTG hosted by a particular channel, the system 300 provides him/her with access to a set of surveillance cameras. The set of surveillance cameras may, for example, be associated with a specific ERT and, as a result, the user selecting the specific VTG would then receive or have access to all video feeds associated with the particular VTG. In an example embodiment, the association between the video feeds and a communication channel may be configured at a central location. For example, the association may be statically configured in an IPICS database. The configuration may also be based on a policy or the roles the individual users may play in an emergency operation. In one example embodiment, a policy module (e.g., the policy module 312) has access to the GPS information (not shown) of the users (e.g., the users 305.1-305.$q$ or 307.1-307.$r$). The policy module then may, for example, automatically facilitate access to video streams relevant to the locations of ERT team members.

Figure 6:
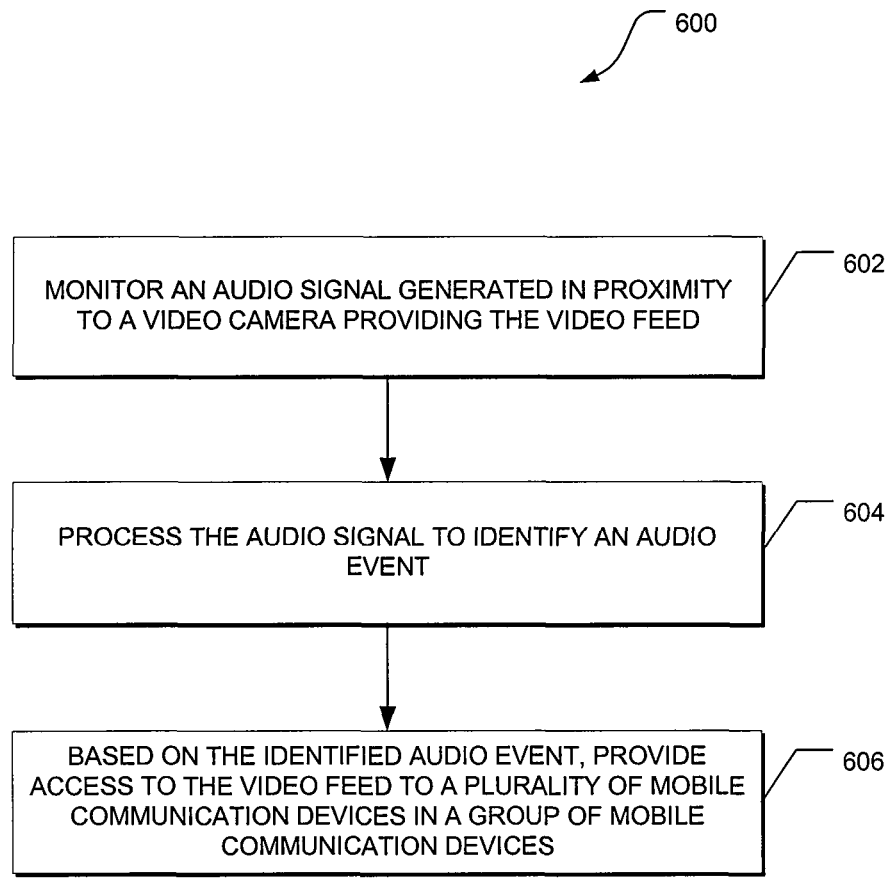
FIG. 6 depicts a flow diagram of a general overview of a method, in accordance with an example embodiment, for associating video feeds with communication channels based on an audio event.

FIG. 6 shows a flow diagram of a general overview of a method 600, in accordance with an example embodiment, for associating video feeds with communication channels based on an audio event. In one example embodiment, the method 600 described below may be implemented at least in part by the policy module 312. As shown at block 602, the method 600 monitors an audio signal generated in proximity to a video camera providing a video feed. For example, the audio signal may be a gunshot requiring a response by an ERT. As shown at block 604, the method 600 may process the audio signal to identify an audio event (e.g., the gunshot). Once the audio event had been identified, the identified video feed from the surveillance camera may be associated with a communication channel associated with the ERT. Thus, based on an identified audio event, access to a video feed may be provided to a plurality of mobile communication devices in a group of mobile communications associated with the event (see block 606).

Figure 7:
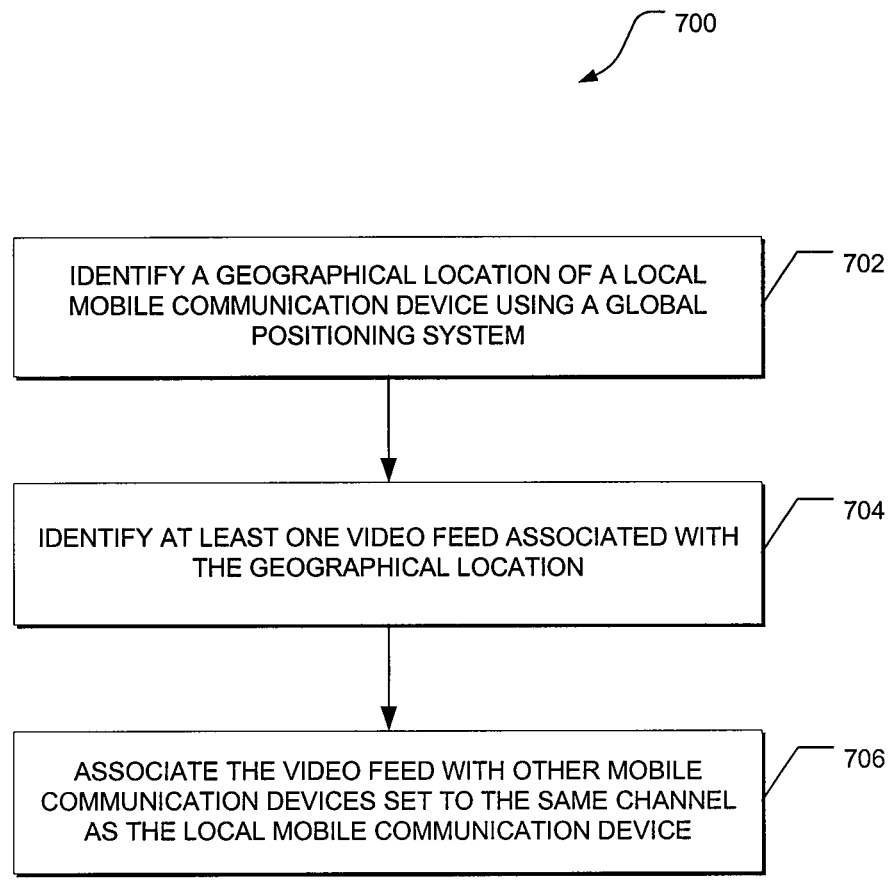
FIG. 7 depicts a flow diagram of a general overview of a method, in accordance with an example embodiment, for associating video feeds with communication channels based on geographical location data.

FIG. 7 depicts a flow diagram of a general overview of a method 700, in accordance with an example embodiment, for associating video feeds with communication channels based on geographical location data. As shown at block 702, a geographical location of a local mobile communication device may be identified using a global positioning system (GPS). Thereafter, as shown at block 704, the method 700 may identify at least one video feed associated with the identified geographical location. In one example embodiment, based on a specific policy governing the policy module 312, the identified video feed may then be automatically associated with other mobile communication devices set to the same channel as the local communication device. (See block 706).

When the method 700 is deployed in the system 300, a control center (e.g., an IPICS) may dynamically access a GPS location of each mobile communication device, 304.1-304.$q$, 306.1-306.*r*. The control center may also maintain information about, or have access to, a range of views covered by video cameras provided at various geographical locations. In an example embodiment, a matching module may be provided to match mobile communication devices 304.1-304.*q*, 306.1-306.*r* and, accordingly, associate users 305.1-305.*q*, 307.1-307.*r* with one or more video streams. For example, mobile communication devices 304.1-304.*q*, 306.1-306.*r* within a given radius of a particular video camera may be identified. Thus, when a mobile communication device 304.1-304.*q*, 306.1-306.*r* is located within the aforementioned radius, access to video feeds within the radius may be provided to the users 305.1-305.*q*, 307.1-307.*r* an associated mobile communication device 304.1-304.*q*, 306.1-306.*r*.

In an example embodiment, when two or more users are placed into a common VTG, and hence associated with a common communication channel, the list or group of available video streams to which each user has access may be automatically updated to include video feeds seen by all members of a particular team associated with the common communication channel. Thus, in an example embodiment, all team members having their mobile communication devices 304.1-304.*q*, 306.1-306.*r* set to a common communication channel may share the same video information.

Figure 8:
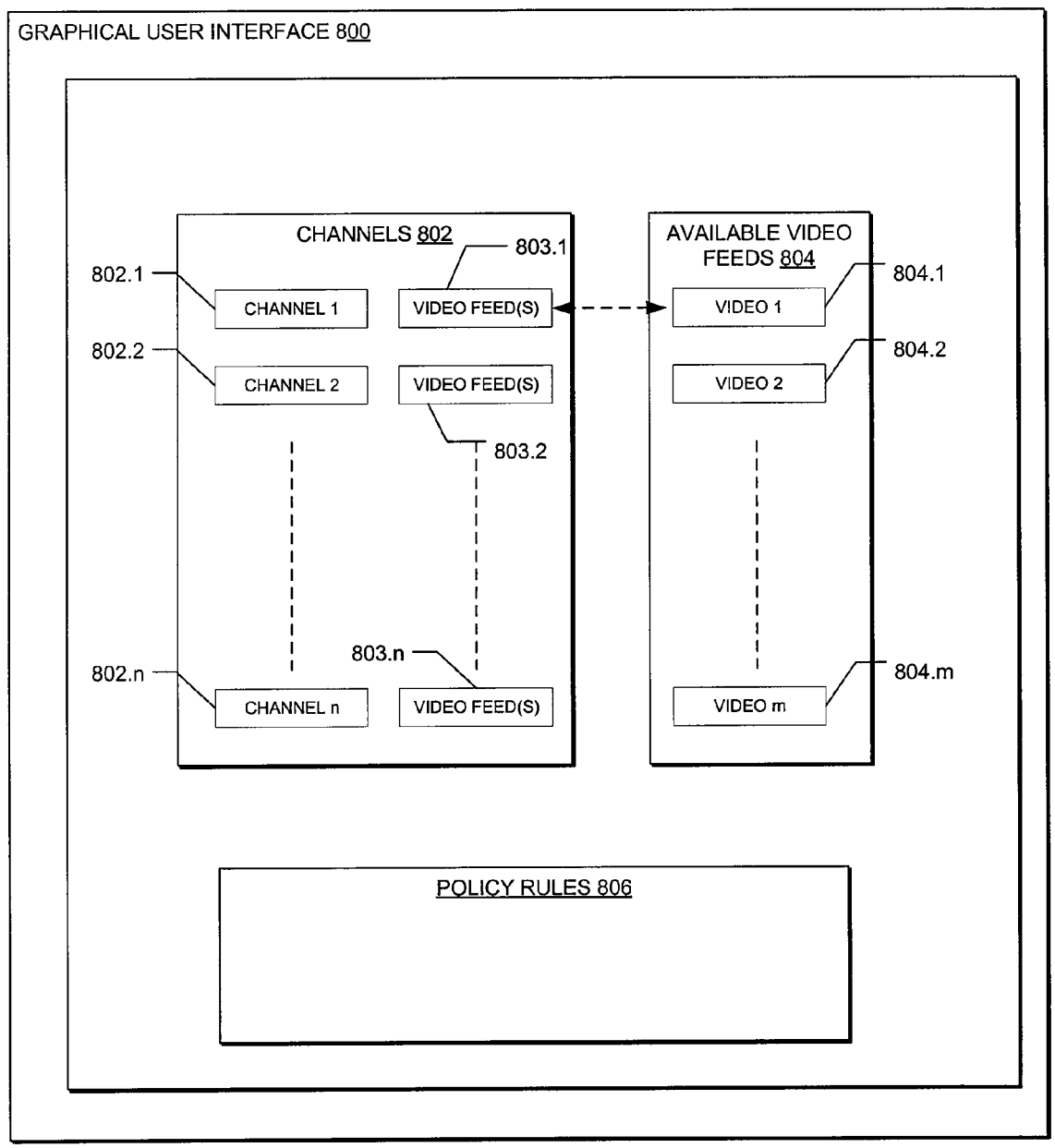
FIGS. 8-10 depict schematic views of graphical user interfaces, in accordance with an example embodiment, for associating video feeds with communication channels.

FIG. 8 shows an example GUI 800, in accordance with an example embodiment, to allow a user to select a video feed associated with a communication channel. For example, the GUI 800 may be provided on one or more of the mobile communication devices 304.1-304.*q*, 306.1-306.*r*. In an example embodiment, the GUI 800 may be generated by the graphical user interface module 208 of the apparatus 200 (see FIG. 2).

The GUI 800 is shown to include a channels zone 802 and available video feed zone 804. The channel zone 802 shows a plurality of communication channels 802.1-802.*n* to which the mobile communication device 304.1-304.*q*, 306.1-306.*r* may be set. Associated with each channel 802.1-802.*n* is a video feed drop-down menu 803.*n* to allow a user to select one of a plurality of video feeds automatically associated with an associated channel 802.1-802.*n*. In the example GUI 800 shown in FIG. 8, video feeds 804.1-804.*m* are shown to be available from the video dropdown menu 803.1. Thus, using the GUI 800, a user may thus select a video feed for viewing on the communication device.

In an example embodiment, the available feeds may be based on an access policy or a particular role (e.g., coordinator, response team member, or the like) that is associated with the user of a mobile communication device. Thus, in an example embodiment, the policy rules 806 associated with the communication channel of a specific zone are displayed. Accordingly, in an example embodiment, the GUI 800 allows a user to select one of a plurality of channels and, when a particular channel is selected, videos associated with the channel are available for viewing by the user. It should be noted that while the system 300 may automatically facilitate viewing of the associated video feeds, it may also prevent the user from accessing video feeds which are not required to fulfill his/her duties, thus at least reducing the user from experiencing unnecessary information overload.

Figure 9:
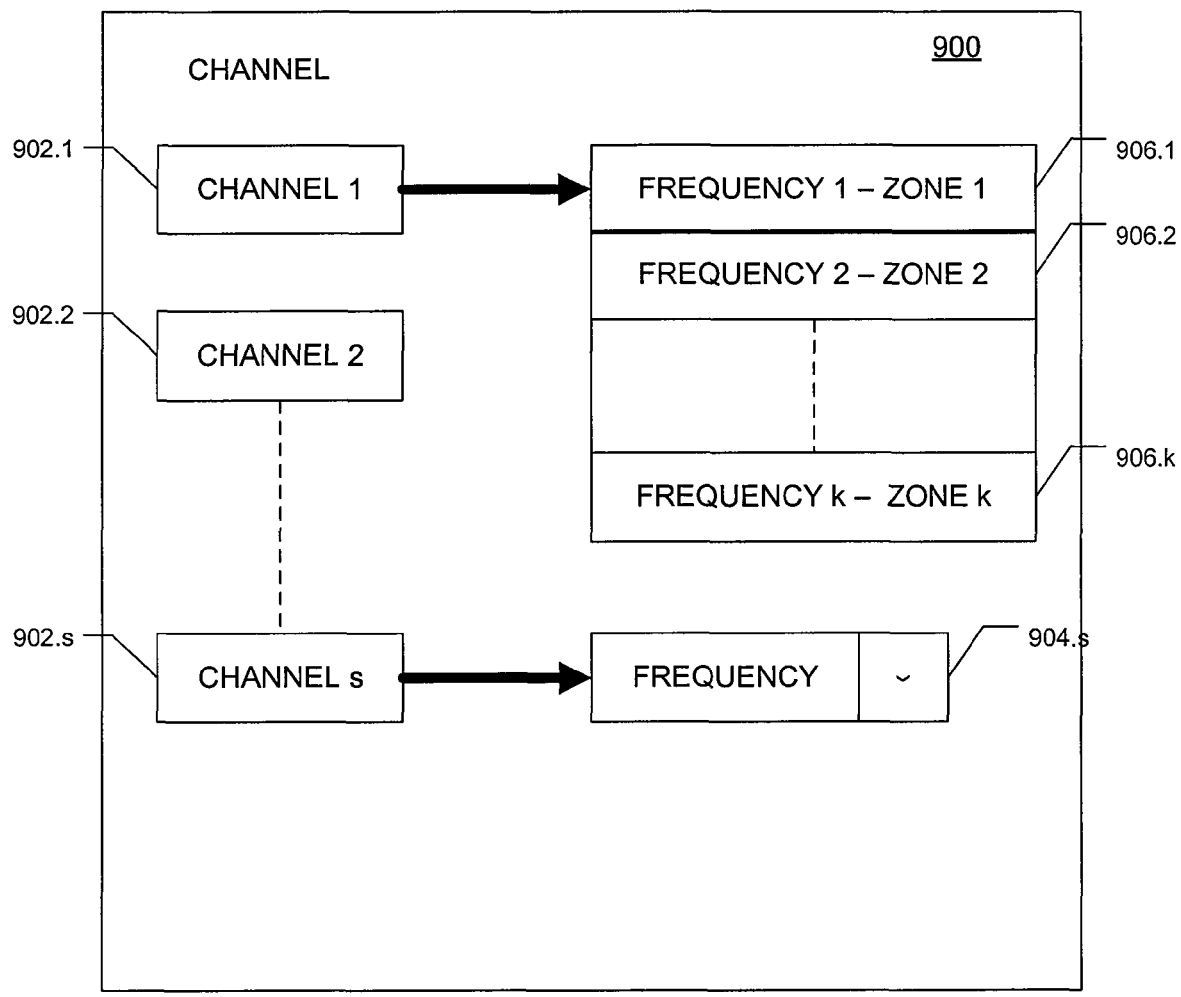

FIG. 9 shows a GUI 900 in accordance with an example embodiment, to allow a user to select a communication frequency associated with a communication channel. The GUI 900 is shown to include a plurality of channel identifiers 902.1-902.*s*, each of which has an associated frequency drop-down menu (see drop-down menu 904.*s*). For example, when a user selects a drop-down menu associated with the first channel 902.1, it is expanded to provide a plurality of available frequencies to which channel 1 may be tuned (see expanded drop-down menu 906). The expanded drop-down menu 906 is shown to include a first frequency 906.1 associated with a first zone, a second frequency 906.2 associated with a second zone and so on. In an example embodiment, the frequencies may however, in addition or instead, be associated with one or more emergency response teams. When a particular frequency is selected from the expanded drop-down menu 906, the transmission and receiving frequency of the associated radio base station may be changed accordingly and access to the associated video stream may be granted to the user.

In an example embodiment, a user may select a specific VTG by selecting one of the channels 902.1-902.*s*. Thereafter, a frequency associated with a region in which the user is located may be selected using the drop-down menus. Thereafter, in an automated manner without human intervention, groups of video feeds (e.g., surveillance cameras) may then be accessible by the user. Thus, in an example embodiment, a radio frequency of a given base station in a specific geographical region may be selected, thereby automatically providing access to video feeds associated with the selected frequency.

For example, the frequency 906.1 may be associated with ERT 1 and the second frequency 906.2 may be associated with ERT 2. Accordingly, when a user alters the frequency of the radio base station from the first frequency 906.1 to the second frequency 906.2, the list of available video feeds changes from video feeds associated with ERT 1 to video streams associated with ERT 2. Accordingly, in an example embodiment, a specific user may only receive those video feeds that are relevant to a particular ERT and, accordingly, not be presented with a plurality of video feeds that are not, under the circumstances, relevant to the specific user. In an example embodiment, a dispatcher at a control center may associate a set of video feeds with a given channel (e.g., one of the channels 902.1-902.*s*). In yet another example embodiment, a dispatcher at an operations center may make the selection of channel and/or the frequency that are made available to a user.

When the user accesses or sets his/her mobile communication device to a channel 902.1-902.*s*, associated video feeds are automatically accessible by the user. In an example embodiment, the channels 902.1-902.*s* are PPT channels in a PTT communication network.

Figure 10:
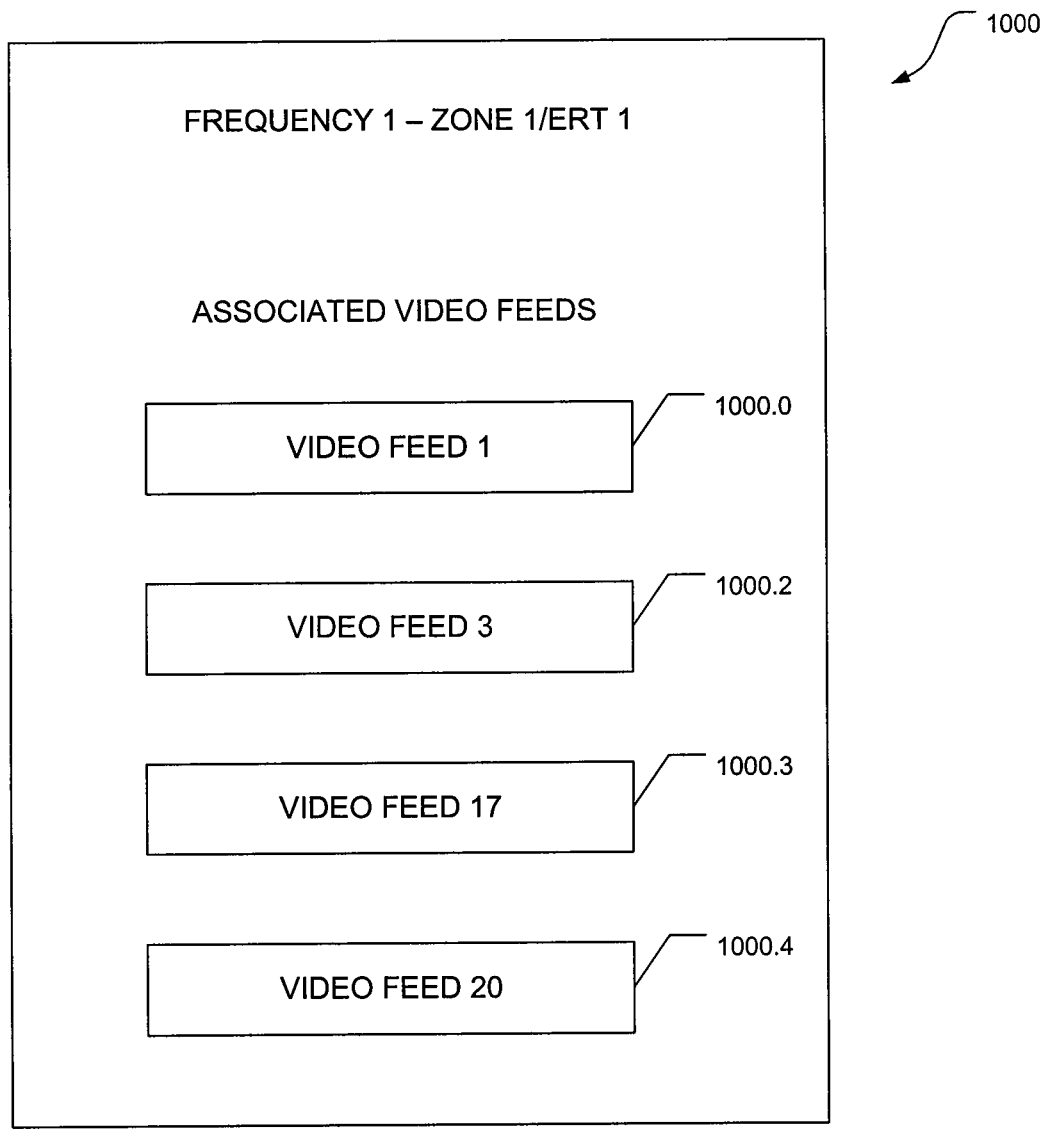

FIG. 10 shows a GUI 1000, in accordance with an example embodiment, to allow an administrator to associate one or more video feeds with a communication channel. In an example embodiment, the GUI 1000 may be provided at a central control facility where an administrator console is provided. It will be appreciated that the GUI 1000 may have various different drop-down menus to configure channels, frequencies, and associated video streams. The GUI 1000 is shown in a state where an administrator has chosen a first frequency associated with a first zone or ERT (see also the GUI 900 of FIG. 9). The GUI 1000 reflects a situation where the administrator has associated video feeds 1000.1-1000.4 with the first frequency. It will, however, be appreciated that the GUI 1000 could be configured to allow selection of any different video feeds with a particular frequency. It should be noted that in an example embodiment, an administrator or dispatcher in a central control facility may script or configure a policy which governs the association of video streams with communication channels and VTGs. The system 300 (e.g., in the policy module 312) may automatically associate the video feeds with an appropriate channel and VTG. The system 300 may then automatically provide access to the video streams to the users of the channel and/or VTG.

Figure 11:
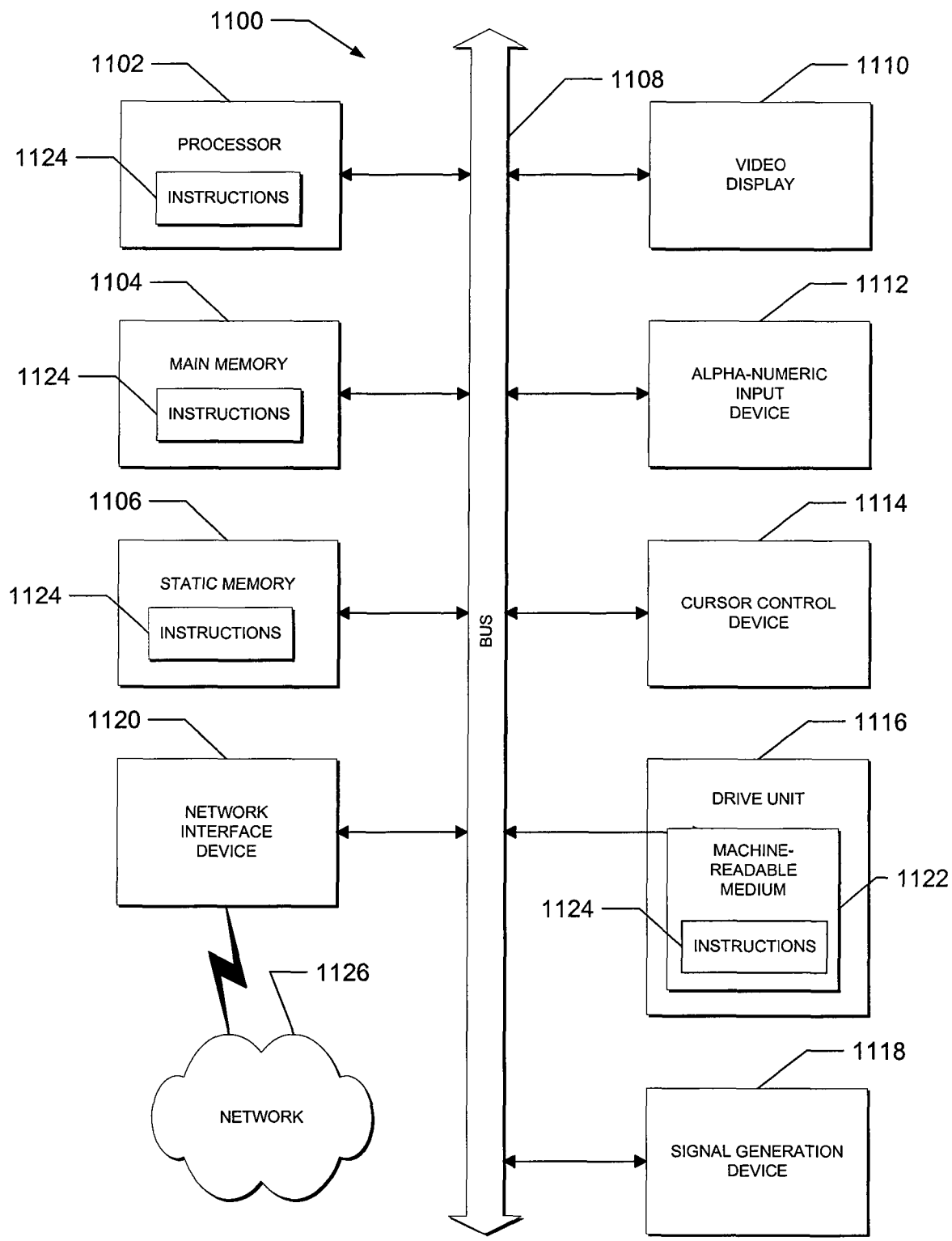
FIG. 11 is a simplified block diagram of a machine in the example form of a computing system within which a set of instructions, for causing the machine to perform any one or more of the methodologies discussed herein, may be executed.

FIG. 11 is a simplified block diagram of a machine in the example form of a computing system within which a set of instructions for causing the machine to perform any one or more of the methodologies discussed herein may be executed. In alternative embodiments, the machine may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 1100 includes a processor 1102 (e.g., a central processing unit (CPU), a graphics processing unit (GPU) or both), main memory 1104 and static memory 1106, which communicate with each other via bus 1108. The computing system 1100 may further include video display unit 1110 (e.g., a plasma display, a liquid crystal display (LCD) or a cathode ray tube (CRT)). The computing system 1100 also includes alphanumeric input device 1112 (e.g., a keyboard), user interface (UI) navigation device 1114 (e.g., a mouse), disk drive unit 1116, signal generation device 1118 (e.g., a speaker), and network interface device 1120.

A disk drive unit 1116 includes machine-readable medium 1122 on which is stored one or more sets of instructions and data structures (e.g., software 1124) embodying or used by any one or more of the methodologies or functions described herein. Software 1124 may also reside, completely or at least partially, within main memory 1104 and/or within the processor 1102 during execution thereof by the computing system 1100, with the main memory 1104 and the processor 1102 also constituting machine-readable, tangible media. Software 1124 may further be transmitted or received over a network 1126 via a network interface device 1120 using any one of a number of well-known transfer protocols (e.g., Hypertext Transfer Protocol (HTTP)).

While the machine-readable medium 1122 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that causes the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for embedding priorities in multimedia streams may be implemented with facilities consistent with any hardware system(s) defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
   monitoring a selection of a communication channel by a user of a mobile communication device;
   providing a plurality of radio frequencies on a display of the mobile communication device, each radio frequency being associated with a geographical zone from which a plurality of video feeds associated with the geographic zone are sourced;
   monitoring a selection of a radio frequency of the plurality of radio frequencies by the user.
   identifying at least one video feed by selecting the at least one video feed from the plurality of video feeds associated with the geographic zone, wherein the at least one video feed is associated with the selected communication channel based on a user policy that identifies one or more video feeds that are relevant to the user when the user accesses the selected communication channel, the one or more video feeds being independent of the selected communication channel; and
   providing access to the identified at least one video feed to the mobile communication device based on the user policy.

2. The method of claim 1, wherein providing access comprises associating the identified at least one video feed with the mobile communication device in a database that is used to manage access to independent video feeds in a network based on audio communication channels that are selected by communication devices in the network.

3. The method of claim 1, further comprising:
   accessing a database to identify a plurality of members of an emergency response team that includes the user of the mobile communication device; and
   presenting a plurality of available video feeds on the display of the mobile communication device, the plurality of available video feeds including video streams associated with the plurality of members of the emergency response team.

4. The method of claim 3, wherein the available video feeds are sourced from a group of surveillance cameras.

5. The method of claim 1, wherein the communication channel is a Push-To-Talk (PTT) channel in a PTT communication network and the mobile communication device is a PTT radio.

6. The method of claim 1, further comprising:
   accessing a database to identify a group of video feeds associated with the user; and
   when the user selects the communication channel, providing access to the group of video feeds associated with the user to one or more other users of the communication channel.

7. The method of claim 1, further comprising:
monitoring an audio signal generated in proximity to a video camera providing a first video feed included in the identified at least one video feed;
processing the audio signal to identify an audio event; and
based on the identified audio event, providing access to the first video feed to a plurality of mobile communication devices in a group of mobile communication devices, the group of mobile communication devices including the mobile communication device of the user corresponding to the selection of the communication channel.

8. The method of claim 1, wherein the communication channel is associated with a Virtual Talk Group (VTG).

9. The method of claim 1, wherein providing access to the video feeds depends on a video association policy.

10. The method of claim 9, wherein the video association policy includes a role of the user defined in a policy database.

11. The method of claim 1, further comprising:
identifying a geographical location of the user's mobile communication device using a Global Positioning System;
identifying that the at least one video feed is associated with the geographical location; associating the at least one video feed with other mobile communication devices set to the same channel as the user's mobile communication device; and
automatically rendering access to the at least one video feed to the other mobile communication devices.

12. The method of claim 1, wherein the selected communication channel is a selected audio communication channel that is selected from a plurality of audio communication channels, the at least one video feed being associated with the selected audio communication channel, and the user policy identifying the one or more video feeds that are relevant to the user when the user accesses the selected audio communication channel.

13. The method of claim 1, wherein the user policy associates the at least one video feed with the selected communication channel based on the geographic zone from which the at least one video feed is sourced and a device group that includes the user's communication device.

14. The method of claim 1, wherein the user policy associates the at least one video feed with the selected communication channel by comparing a first geographic zone from which the at least one video feed is sourced with a second geographic zone corresponding to a location of the user's communication device.

15. An apparatus, comprising:
at least one processor; and
a memory in communication with the at least one processor, the memory being configured to store a video stream association module executable by the at least one processor, and the video stream association module being executed by the at least one processor to cause operations to be performed, the operations comprising:
monitoring a selection of a communication channel by a user of a mobile communication device;
providing a plurality of radio frequencies on a display of the mobile communication device, each radio frequency being associated with a geographical zone from which a plurality of video feeds associated with the geographic zone are sourced;
monitoring a selection of a radio frequency of the plurality of radio frequencies by the user;
identifying at least one video feed by selecting the at least one video feed from the plurality of video feeds associated with the geographic zone, wherein the at least one video feed is associated with the selected communication channel based on a user policy that identifies one or more video feeds that are relevant to the user when the user accesses the selected communication channel, the one or more video feeds being independent of the selected communication channel; and
providing access to the identified at least one video feed to the mobile communication device based on the user policy.

16. The apparatus of claim 15, wherein providing access comprises associating the identified at least one video feed with the mobile communication device in a database that is used to manage access to independent video feeds in a network based on audio communication channels that are selected by communication devices in the network.

17. The apparatus of claim 15, wherein the operations further comprise:
accessing a database to identify a plurality of members of an emergency response team that includes the user of the mobile communication device; and
presenting a plurality of available video feeds on the display of the mobile communication device, the plurality of available video feeds including video streams associated with the plurality of members of the emergency response team.

18. The apparatus of claim 17, wherein the available video feeds are sourced from a group of surveillance cameras.

19. The apparatus of claim 15, wherein the communication channel is a Push-To-Talk (PTT) channel in a PTT communication network and the mobile communication device is a PTT radio.

20. The apparatus of claim 15, wherein the operations further comprise:
accessing a database to identify a group of video feeds associated with the user; and
when the user selects the communication channel, providing access to the group of video feeds associated with the user to one or more other users of the communication channel.

21. The apparatus of claim 15, wherein the operations further comprise:
monitoring an audio signal generated in proximity to a video camera providing a first video feed included in the identified at least one video feed;
processing the audio signal to identify an audio event; and
based on the identified audio event, providing access to the first video feed to a plurality of mobile communication devices in a group of mobile communication devices, the group of mobile communication devices including the mobile communication device of the user corresponding to the selection of the communication channel.

22. The apparatus of claim 15, wherein the communication channel is associated with a Virtual Talk Group (VTG).

23. The apparatus of claim 15, wherein providing access to the video feed depends on a video association policy, the video association policy including a role of the user defined in a policy database.

24. The apparatus of claim 15, wherein the operations further comprise:
identifying a geographical location of the user's mobile communication device using a Global Positioning System;
identifying that the at least one video feed is associated with the geographical location; associating the at least one video feed with other mobile communication devices set to the same channel as the user's mobile communication device; and automatically rendering access to the at least one video feed to the other mobile communication devices.

25. An apparatus comprising:
a monitor module to monitor a selection of an audio communication channel by a user of a mobile communication device and to monitor selection of a radio frequency of a plurality of radio frequencies by the user;
a graphical user interface to display the plurality of radio frequencies on a display of the mobile communication device, each radio frequency being associated with a geographical zone from which a plurality of video feeds associated with the geographic zone are sourced, and
a channel identifier module to identify at least one video feed by selecting the at least one video feed from the plurality of video feeds associated with the geographic zone, wherein the at least one video feed is associated with the selected audio communication channel based on a user policy that identifies one or more video feeds that are relevant to the user when the user accesses the selected audio communication channel, the one or more video feeds being independent of the selected communication channel; and
means for providing access to the identified at least one video feed to the mobile communication device based on the user policy.

26. The apparatus of claim 25, wherein the means for providing access associates the identified at least one video feed with the mobile communication device in a database that is used to manage access to independent video feeds in a network based on audio communication channels that are selected by communication devices in the network.

27. The apparatus of claim 25, further comprising means for accessing a database to identify a plurality of members of an emergency response team including the user of the mobile communication device, and wherein the graphical user interface displays a plurality of available video feeds on the display of the mobile communication device, the plurality of available video feeds including video streams associated with the plurality of members of the emergency response team.

28. The apparatus of claim 25, further comprising:
means for monitoring an audio signal generated in proximity to a video camera providing a first video feed included in the identified at least one video feed;
means for processing the audio signal to identify an audio event; and
based on the identified audio event, the means for providing access provides access to the first video feed to a plurality of mobile communication devices in a group of mobile communication devices, the group of mobile communication devices including the mobile communication device of the user corresponding to the selection of the communication channel.

29. The apparatus of claim 25, further comprising a policy module to associate the user policy with the at least one video feed with the selected communication channel based on the geographic zone from which the at least one video feed is sourced and a device group that includes the user's communication device.

30. The apparatus of claim 25, further comprising a policy module to associate the user policy with the at least one video feed with the selected communication channel by comparing a first geographic zone from which the at least one video feed is sourced with a second geographic zone corresponding to a location of the user's communication device.

* * * * *

UNITED STATES PATENT AND TRADEMARK OFFICE
CERTIFICATE OF CORRECTION

PATENT NO. : 8,994,830 B2  
APPLICATION NO. : 12/188982  
DATED : March 31, 2015  
INVENTOR(S) : Shmuel Shaffer et al.

Page 1 of 1

It is certified that error appears in the above-identified patent and that said Letters Patent is hereby corrected as shown below:

In the claims,

Column 12, Line 27, after the word "user" change "." to --;--

Signed and Sealed this  
Eighth Day of March, 2016

Michelle K. Lee  
*Director of the United States Patent and Trademark Office*